US011409898B1

(12) United States Patent
Jensen et al.

(10) Patent No.: US 11,409,898 B1
(45) Date of Patent: Aug. 9, 2022

(54) SECURE DATA BROKER FOR SENSITIVE DATA

(71) Applicant: RapidDeploy, Inc., Austin, TX (US)

(72) Inventors: Justin Jensen, Seguin, TX (US); Brett Meyerowitz, Cape Town (ZA); Ivor Chalton, Cape Town (ZA); Cameron Plimsoll, Cape Town (ZA)

(73) Assignee: RapidDeploy, Inc., Austin, TX (US)

( * ) Notice: Subject to any disclaimer, the term of this patent is extended or adjusted under 35 U.S.C. 154(b) by 202 days.

(21) Appl. No.: 16/707,507

(22) Filed: Dec. 9, 2019

Related U.S. Application Data

(60) Provisional application No. 62/776,928, filed on Dec. 7, 2018.

(51) Int. Cl.
*H04L 29/00* (2006.01)
*G06F 21/62* (2013.01)
*H04L 9/40* (2022.01)
*H04L 67/10* (2022.01)
*G06F 16/2455* (2019.01)
*H04L 67/562* (2022.01)

(52) U.S. Cl.
CPC ...... *G06F 21/6227* (2013.01); *G06F 16/2455* (2019.01); *H04L 63/0428* (2013.01); *H04L 63/0869* (2013.01); *H04L 63/102* (2013.01); *H04L 63/18* (2013.01); *H04L 67/10* (2013.01); *H04L 67/2809* (2013.01)

(58) Field of Classification Search
CPC ............. G06F 21/6227; G06F 16/2455; H04L 63/0428; H04L 63/0869; H04L 63/102; H04L 63/18; H04L 67/10; H04L 67/2809
See application file for complete search history.

(56) References Cited

U.S. PATENT DOCUMENTS

| 6,874,088 | B1* | 3/2005 | Stevens | H04L 63/0281 |
| | | | | 380/229 |
| 10,447,865 | B2* | 10/2019 | Mehta | H04W 80/04 |
| 2006/0040639 | A1* | 2/2006 | Karl | H04W 76/50 |
| | | | | 455/404.1 |
| 2011/0246765 | A1* | 10/2011 | Schibuk | H04L 63/0823 |
| | | | | 713/158 |
| 2013/0128776 | A1* | 5/2013 | Singer | H04W 4/90 |
| | | | | 370/259 |
| 2014/0051381 | A1* | 2/2014 | Ginter, Jr | H04M 1/57 |
| | | | | 455/404.1 |

(Continued)

*Primary Examiner* — Don G Zhao
(74) *Attorney, Agent, or Firm* — Patent Capital Group

(57) ABSTRACT

A secure data broker includes a public network interface, an authorization module, a database interface, and an encryption module. The public network interface is configured to receive a database query and authorization information from a client device over a secure connection and return a response to the database query to the client device over the secure connection. The authorization module is configured to authorize the client device based on the authorization information, which was issued to the client device by the public safety platform. The database interface is configured to submit the database query to a secure database in response to the authorization of the client device and to receive the response to the database query from the secure database. The encryption module is configured to encrypt the response to the database query using a broker key.

20 Claims, 8 Drawing Sheets

(56) References Cited

U.S. PATENT DOCUMENTS

| | | | |
|---|---|---|---|
| 2015/0163642 A1* | 6/2015 | Bates | H04W 4/029 |
| | | | 455/404.2 |
| 2016/0014585 A1* | 1/2016 | Sundararaj | G08B 25/10 |
| | | | 455/404.1 |
| 2016/0127343 A1* | 5/2016 | Schiller | H04L 63/102 |
| | | | 726/9 |
| 2016/0316493 A1* | 10/2016 | Davis | H04W 4/14 |
| 2017/0025000 A1* | 1/2017 | Lagassey | G08G 1/205 |
| 2017/0032009 A1* | 2/2017 | Thakkar | G06F 16/2358 |
| 2017/0270252 A1* | 9/2017 | Feit | G08G 1/205 |
| 2018/0053401 A1* | 2/2018 | Martin | H04L 12/1895 |
| 2018/0109378 A1* | 4/2018 | Fu | H04L 9/0852 |
| 2018/0372878 A1* | 12/2018 | Syrjarinne | H04L 9/3213 |
| 2019/0097791 A1* | 3/2019 | Hersans | G06F 12/0875 |
| 2019/0174208 A1* | 6/2019 | Speicher | H04W 84/18 |
| 2019/0373112 A1* | 12/2019 | Jensen | H04L 65/1046 |
| 2019/0380020 A1* | 12/2019 | Pellegrini | H04W 4/021 |
| 2020/0050996 A1* | 2/2020 | Generes, Jr | G06Q 10/063112 |
| 2020/0379079 A1* | 12/2020 | Dupray | G01S 5/0263 |

\* cited by examiner

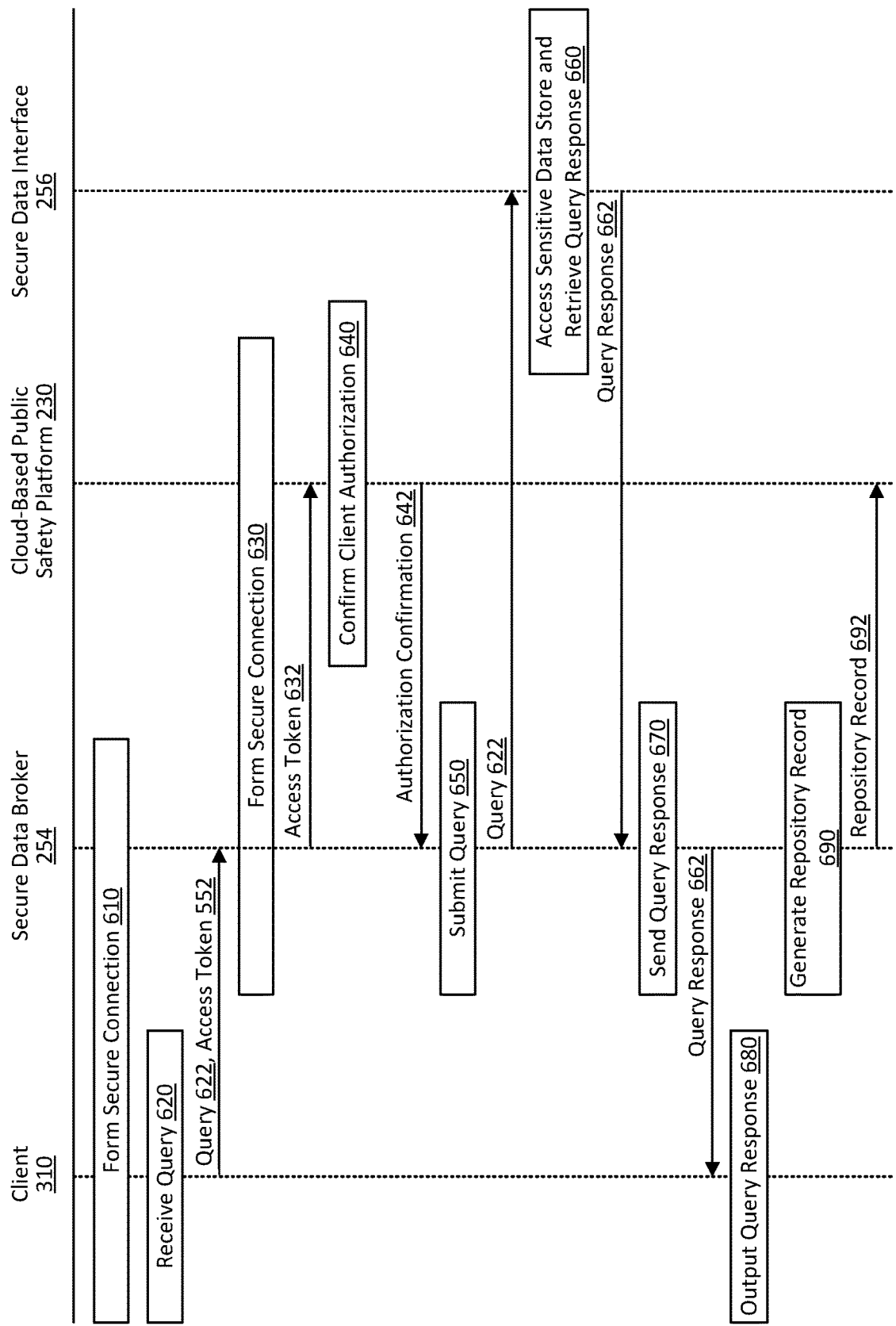

SECURE DATA BROKER FOR SENSITIVE DATA

CROSS REFERENCE TO RELATED APPLICATIONS

This application claims the benefit of priority to U.S. Provisional Application No. 62/776,928, filed Dec. 7, 2018, the disclosure of which is hereby incorporated by reference herein in its entirety for all purposes.

BACKGROUND

Criminal justice databases are an important tool for emergency and law enforcement personnel in investigating potential crimes and responding to emergencies. The Criminal Justice Information Services Division (CJIS) of the FBI collects nationwide law enforcement data that is available to authorized personnel. For example, state or regional law enforcement agencies provide access to data in a CJIS database for agencies within their state or region, and may also make state or regional law enforcement data available to other authorized personnel.

Law enforcement databases contain sensitive data and, therefore, have strict access requirements. For example, accessing the data in a law enforcement database may have rigorous audit and data security requirements. Typically, to control access to the sensitive law enforcement data, authorized users are only able to access law enforcement data on private networks (e.g., police station networks, private radio networks, etc.). The sensitive data is not provided in an encrypted format and is not suitable for sending over a public network. However, while mobile networking in other areas has increased significantly, the existing private networks for providing law enforcement data have significant limitations, e.g., lack of coverage for mobile responders. Furthermore, the services being used by first responders and law enforcement personnel are increasingly network and cloud-based. Moving law enforcement services to the cloud provides several advantages, including the ability to quickly deploy new features and updates to all users, reducing on-site infrastructure, and increasing immunity to malware attacks. However, current methods for accessing law enforcement data do not provide access for mobile users on a public network, and do not provide integration to cloud-based law enforcement services.

SUMMARY

Systems and methods that enable an authorized user to access sensitive data across a public network are described herein. A secure data broker forms an interface between an authorized client device and a secure database, enabling an authorized user to access sensitive data stored on the database with a high degree of data security and in accordance with data security policies for the data. In addition, the secure data broker has a broker key that it uses to encrypt queries, query results, and/or audit data. The data encrypted by the secure data broker can be securely stored off-site, e.g., in cloud storage, for later retrieval and recovery by the secure data broker.

More particularly, the secure data broker forms a secure connection to the client device and authorizes the client device and/or a user of the client device. The secure data broker receives a query for the secure database, e.g., a query for law enforcement data from a CJIS database, over the secure connection. The secure data broker submits the query to the secure database and receives a result. For example, the secure data broker may submit the query to a CJIS interface located on-premise at a public safety facility that has a direct connection to a private network for CJIS data. The secure data broker returns the query result to the client device over the secure connection. The secure data broker also uses its broker key to encrypt the query and/or query result, and/or data about the query (e.g., the requesting user and/or client device). The secure data broker transmits this information to an audit repository and/or response repository. The information can be recovered by the secure data broker, but is not available to anyone who does not have the broker key. In particular, because of the encryption, the stored information cannot be recovered by the entity storing the information.

BRIEF DESCRIPTION OF THE DRAWINGS

FIG. 6 is an illustration of an interaction diagram showing a process for securely providing sensitive to a client using a secure data broker, in accordance with one example embodiment.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Prior Art Environment for Accessing Sensitive Data

Figure 1:
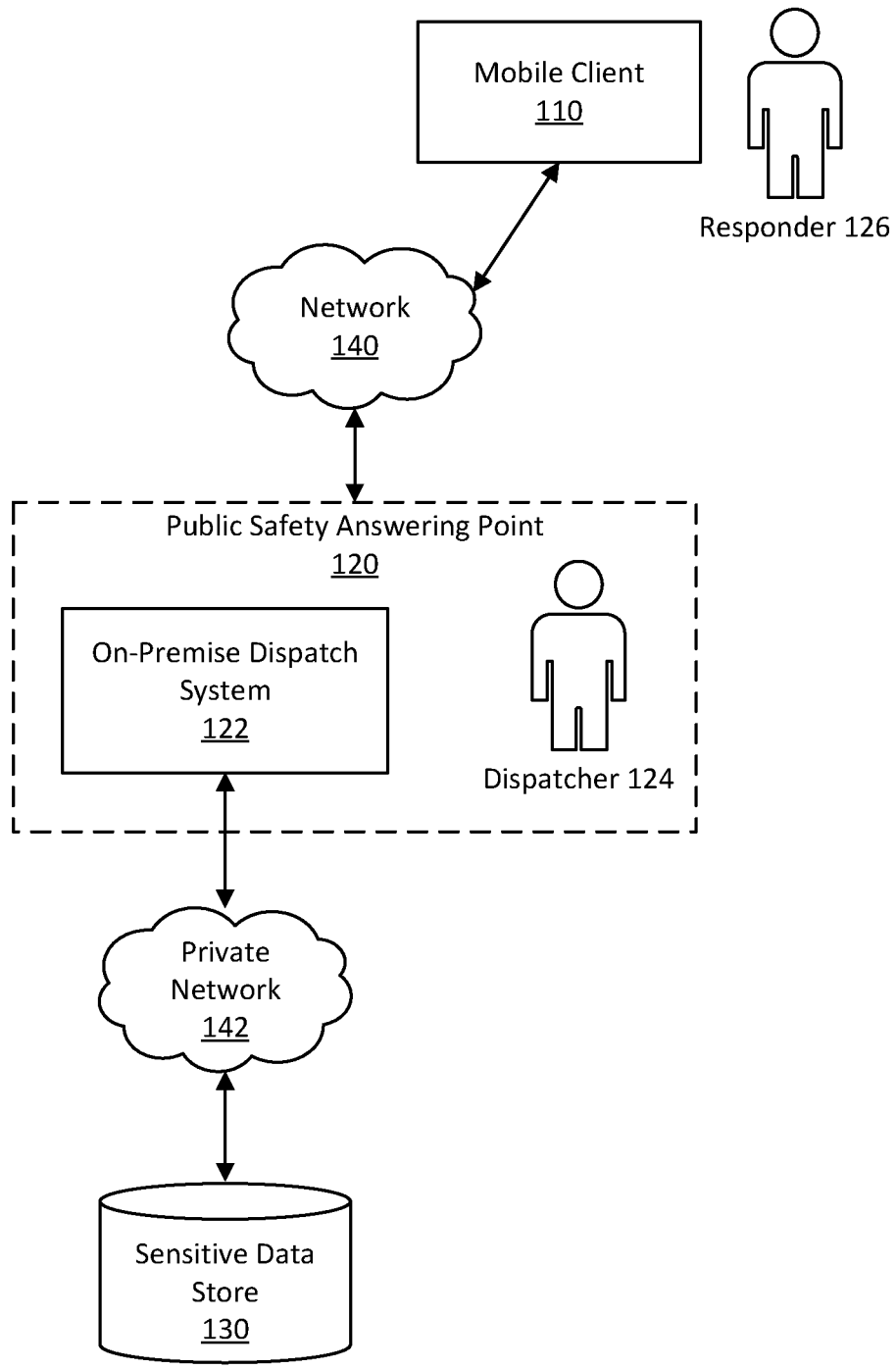
FIG. 1 is a block diagram of a prior art implementation of a system environment for accessing sensitive data.

FIG. 1 is a block diagram of a prior art implementation of a system environment 100 for accessing sensitive data. The system environment 100 includes a mobile client 110, a public safety answering point (PSAP) 120, and a sensitive data store 130. The system environment 100 is configured to allow the users at the PSAP 120 to access sensitive data stored in the sensitive data store 130.

The mobile client 110 is a device within the system environment 100 that assists mobile users, such responder 126, in handling emergencies or other types of events. For example, the mobile client 110 may be a mobile device or a laptop computer that runs one or more applications to assist the responder 126. As a particular example, the mobile client 110 may be a computer system within a police cruiser that a police officer may operate to access information pertinent to handling an event. The information may be provided by the on-premise dispatch system 122, or one or more other data sources. The information may include, for example, a location of the event, information about the type of event, information about the people involved in the event (e.g., phone number, health information, drivers license information), etc.

The PSAP 120 has an on-premise dispatch system 122 that is used by a dispatcher 124 to assist in answering and handling emergency calls. As an example, the PSAP 120 may be an emergency call center for a local police force. In traditional implementations, the on-premise dispatch system 122 is a computer that runs a local computer-aided dispatch (CAD) application. The CAD application provides information about emergency calls and first responders (e.g., police, fire, and medical responders) to the dispatcher 124, and enables the dispatcher 124 to connect to first responders (e.g., responder 126) and dispatch first responders to the locations of emergencies.

The on-premise dispatch system 122 connects to the sensitive data store 130 over a private network 142. The sensitive data store 130 is a storage system configured to securely store sensitive data, such as law enforcement data. The data stored in the sensitive data store 130 may be pertinent to a variety of emergencies that may occur in the system environment 100. For example, the sensitive data store 130 may be a criminal justice information services (CJIS) database that stores a variety of records that can be used for law enforcement and security purposes, e.g., records regarding missing persons, protection orders, criminal histories, wanted persons, driver and automobile licensing information, etc. The on-premise dispatch system 122 may access the data and provide the data to the dispatcher 124 for assistance in safely resolving emergencies or other events.

The mobile client 110 communicates with the PSAP 120 over a network 140. The network 140 may be the Internet, a local area network (LAN), a wide area network (WAN), a radio band, a wireless local area network (WiFi), etc. The network 140 may be public or private depending on the configuration of the system environment 100. In one environment, the network 140 is a portion of the electromagnetic spectrum (e.g., radio band) reserved for emergency service communications.

The sensitive data store 130 provides unencrypted data over the private network 142. Administrators of sensitive data stores may enforce strict access requirements, such as audit requirements to monitor access and use of the data, and data security requirements to prevent the data from reaching unauthorized people or entities. The sensitive data received at the PSAP 120 can be useful to responders 126, but current mechanisms for transmitting the sensitive data to responders 126 may not exist, or may not be sufficiently secure.

In one example, the mobile client 110 connects to the Internet to receive data communications. For example, the mobile client 110 connects to the Internet to receive location and routing information from the PSAP 120 or from another source, so that the mobile client 110 can provide directions to the responder 126 to respond to the event. Because the mobile client 110 is outside the PSAP 120, and cannot directly connect to the sensitive data store 130 via the private network 142, the mobile client 110 is not able to access sensitive law enforcement data. This lack of knowledge can be risky for the responder 126, e.g., if the responder 126 unaware of a prior criminal history of a person or location involved in the event.

In another example, the responder 126 is a police officer, the mobile client 110 is a radio, and the network 140 is a radio network. The responder 126 radios in a request for data associated with a license plate on a speeding vehicle to the dispatcher 124. The dispatcher 124 uses an interface of the on-premise dispatch system 122 to access sensitive data associated with the license plate. The dispatcher 124 reads out the data over the radio connection, and the voice communication is transmitted to the mobile client 110 via the radio network. Law enforcement radio networks are often not secure, so eavesdroppers can access the voice communications, including any sensitive information transmitted over the radio network.

System Environment for Providing Sensitive Data

For reasons described above, traditional dispatch applications (e.g., on-premise dispatch system 122) oftentimes are unable to provide sensitive data to mobile responders, or fail to provide sensitive data to client systems (e.g., mobile client 110) with sufficient data security. The secure data broker described herein enable authorized users, including mobile users, to access sensitive data while maintaining a high degree of security in accordance with prescribed data security policies for the sensitive data. Furthermore, the secure data broker, in conjunction with a cloud-based public safety platform, can securely store audit data describing access and use of the sensitive data according to data security policies set by a data provider. The systems and methods described herein ensure that only authorized users have access to sensitive data, such as law enforcement data, financial data, or personal health data.

Figure 2:
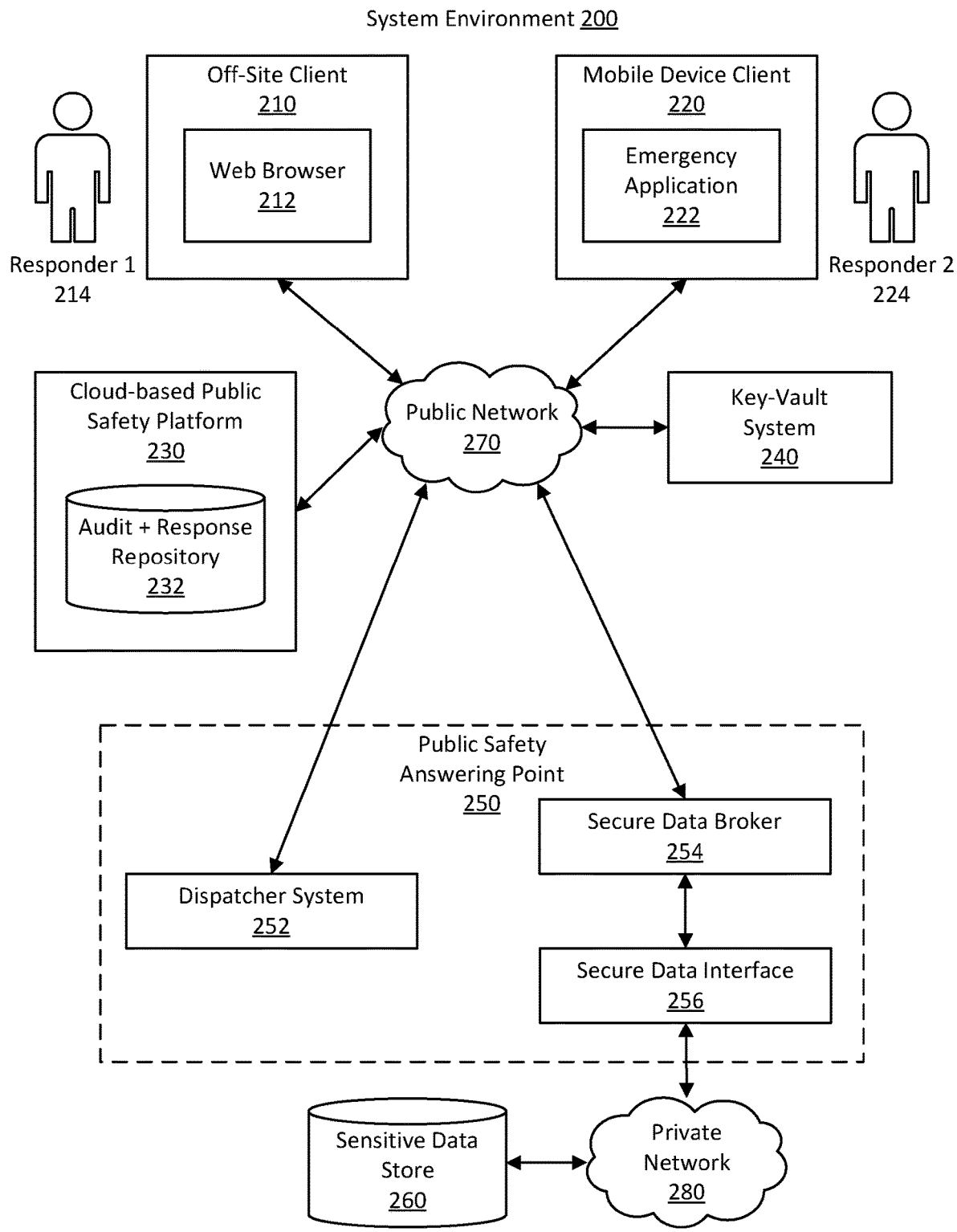
FIG. 2 is a block diagram illustrating a system environment for providing sensitive data to client devices over a public network, in accordance with one example embodiment.

FIG. 2 is a block diagram illustrating a system environment for providing sensitive data to client devices over a public network, in accordance with one example embodiment. The system environment ("environment") 200 includes an off-site client 210, a mobile device client 220, a cloud-based public safety platform 230, a key-vault system 240, a public safety answering point (PSAP) 250, and a sensitive data store 260. The PSAP 250 includes a dispatcher system 252, a secure data broker 254, and a secure data interface 256. The off-site client 210, the mobile device client 220, the cloud-based public safety platform 230, the key-vault system 240, the dispatcher system 252, and the secure data broker 254, are connected to public network 270 (e.g., the Internet). The secure data interface 256 and the sensitive data store 260 communicate via a private network 280. In alternative configurations, different and/or additional systems may be included in the environment 200. For example, FIG. 2 illustrates one off-site client 210 and one mobile device client 220, but the environment 200 may include additional client devices. Further, functionality attributed to one system or component of the environment 200 may be accomplished by a different system included in the environment 200 or a different system than those illustrated.

The cloud-based public safety platform 230 provides the secure data broker 254 to the PSAP 250. The secure data broker 254 enables the secure transfer of sensitive data from the sensitive data store 260 to client devices, such as the off-site client 210 and the mobile device client 220. The cloud-based public safety platform 230 performs tasks related to the transfer and storage of sensitive data, such as authorizing client devices, storing audit and response records, providing applications to client devices that allow them to access sensitive data from the secure data broker 254. This cloud-based approach allows a single entity (e.g., the cloud-based public safety platform 230) to update software (including the secure data broker 254) and access permissions, protocols, standards, etc. across the environment 200 to ensure full functionality, rather than requiring individual systems (e.g., dispatch system 122) to perform the updates locally. The sensitive data handled by the secure data broker 254 is not available to the cloud-based public safety platform 230. The secure data broker 254 encrypts any sensitive data that it sends outside the PSAP 250, e.g., to the cloud-based public safety platform 230 or to a client device 210 or 220. The secure data broker 254 ensures that unencrypted sensitive data is only accessible to authorized users, e.g., telecommunicators within the PSAP 250, or authorized responders 214 and 224.

The off-site client 210 is a device located outside the PSAP 250. The off-site client 210 includes a web browser 212 and is used by responder 1 214. The off-site client 210 may be, for example, a laptop computer, a desktop computer, a smartphone, a tablet, or another type of user device. The off-site client 210 provides a user interface to the responder 1 214 and a network connection to the public network 270, e.g., the Internet. The web browser 212 provides access to a browser-based application that the responder 1 214 uses to interface with the secure data broker 254. In some embodiments, the browser-based application executed by the web browser 212 provides a search form that allows an operator (e.g., responder 1 214) to search for sensitive on the sensitive data store 260. The browser-based application may be an application that assists responders in responding to emergencies. The browser-based application may be provided by the cloud-based public safety platform 230. In one example, the off-site client 210 is a laptop computer in a police car that accesses a browser-based application for first responders. In another example, the off-site client 210 is a computer located at a second PSAP. For example, telecommunicators at the second PSAP may provide backup or overflow support for the PSAP 250, and use a browser-based dispatch application provided by the cloud-based public safety platform 230 to access dispatching resources, including sensitive data from the sensitive data store 260.

The mobile device client 220 is a mobile device located outside the PSAP 250. The mobile device client 220 runs an emergency application 222 and is used by responder 2 224. The mobile device client 220 may be, for example, a smartphone, a tablet, a laptop computer, or another type of mobile device. The mobile device client 220 provides a user interface to the responder 2 224 and a network connection to the public network 270, e.g., the Internet. The emergency application 222 enables the responder 2 224 to interface with the secure data broker 254. In some embodiments, the emergency application 222 provides a search form that allows an operator (e.g., responder 2 224) to search for sensitive data on the sensitive data store 260. The emergency application 222 may be a mobile app that assists responders in responding to emergencies, e.g., by providing routing information, emergency type, details about individuals involved in the emergency (e.g., criminal records, health data). The emergency application 222 may be provided by the cloud-based public safety platform 230. In one example, the mobile device client 220 is a smartphone used by an EMT, and the emergency application 222 provides directions to the emergency and a health history of the patient. In other embodiments, the mobile device client 220 runs additional or alternative applications that allow an operator to search for sensitive data on the sensitive data store 260 and are not focused on emergency response, such as a law enforcement application or a data lookup application.

The PSAP 250 is an emergency call taking center. PSAPs typically include telephony infrastructure for receiving emergency calls and routing the calls to dispatchers working at the PSAP. PSAPs also include dispatch equipment that dispatchers use to communicate information about the emergency calls to appropriate first responders (e.g., police, fire, or medical responders). The dispatcher system 252 is a computer system operated by a dispatcher on-site at the PSAP 250. The dispatcher system 252 includes the hardware and software needed to display user interfaces, connect to the public network 270, and detect user input. The dispatcher system 252 includes an application that allows interaction with the cloud-based public safety platform 230. The application may be a browser that allows a dispatcher to access a web-based CAD service provided by the cloud-based public safety platform 230. Alternatively, the application may be a dedicated application provided by the cloud-based public safety platform 230 to enable interactions with the cloud-based public safety platform 230.

The secure data broker 254 executes on one or more machines located at the PSAP 250. The secure data broker 254 connects to a secure data interface 256, e.g., via a local network (LAN), a direct wired connection, or over a virtual private network (VPN). The secure data interface 256 is an interface to the sensitive data store 260 and has a direct connection over the private network 280 to the sensitive data store 260. For example, a CJIS data administrator may provide direct, wired connections to authorized PSAPs or other agencies (e.g., law enforcement agencies), and provide a secure data interface 256 for use within the PSAP to access a CJIS database. The secure data broker 254 also connects to a public network 270 for transmitting the sensitive data to client devices (e.g., off-site client 210 and mobile device client 220) and/or to the cloud-based public safety platform 230. The secure data broker 254 encrypts the sensitive data prior to transmission, so that the sensitive data can be accessed by authorized users but is not accessible to unauthorized users.

The sensitive data store 260 is a storage system configured to securely store sensitive data, such as law enforcement data. The data stored in the sensitive data store 260 may be pertinent to a variety of emergencies that may occur in the system environment 100. For example, the sensitive data store 260 may be a CJIS database that stores a variety of records that can be used for law enforcement and security purposes, e.g., records regarding missing persons, protection orders, criminal histories, wanted persons, driver and automobile licensing information, etc. In another example, the sensitive data store 260 is a health information database that stores records describing health data of individuals. This health data may be accessed, for example, by EMTs and paramedics responding to a medical emergency. In other embodiments, the sensitive data store 260 stores any type of information that is only provided to authorized users, including personally identifiable information (PII). The data may be subject to data security and access requirements, e.g., data security and access requirements for CJIS data or HIPAA (Health Insurance Portability and Accountability Act) requirements, that are maintained across the environment 200.

The cloud-based public safety platform 230 may provide and manage the browser-based application used by the off-site client 210 and the emergency application 222. The cloud-based public safety platform 230 may also provide and manage the secure data broker 254. In some embodiments, the cloud-based public safety platform 230 is a cloud-based CAD that provides information about emergency calls and first responders to dispatchers, and enables dispatchers to connect to first responders and dispatch first responders to the locations of emergencies. The cloud-based CAD may provide a web interface to the dispatcher system 252, e.g., in website accessed by a browser executing on the dispatcher system 252. The cloud-based CAD may also receive information from the dispatcher system 252 input by the dispatcher, e.g., information about a caller, selections for responding to the call, information about first responders who were dispatched, etc. In other embodiments, the cloud-based public safety platform 230 provides additional or alternative services related to public safety.

The cloud-based public safety platform 230 handles user permissions and authentications. For example, the cloud-based public safety platform 230 enables an operator of the client device 210 or 220 to generate, and log in to, a profile on the cloud-based public safety platform 230. To illustrate, responder 2 224 inputs information for a user profile ("profile information") into the emergency application 222 and the emergency application 222 transmits the profile information to the cloud-based public safety platform 230. The cloud-based public safety platform 230 generates and/or updates a responder profile for responder 2 224 using the profile information. The emergency application 222 may also generate a profile for the mobile device client 220 instead of or in addition to the responder 2 224. Generated profiles may include credentialing information such as passwords, identifying hardware information, and/or identifying network locations for the responder and/or client system ("accessor"). The profile may be associated with access rights for the accessor. For example, the profile may indicate whether or not the accessor is allowed to access the sensitive data store 260. Additionally, the profile may indicate the types of sensitive data the accessor may access from the sensitive data store 260.

The cloud-based public safety platform 230 provides authorization information, such as an access token, to authorized client devices. The authorization information indicates that the client device is permitted to access data from the sensitive data store 260. The cloud-based public safety platform 230 returns the authorization information to the client device in response to receiving credentials from the client device. The client device passes its authorization information to the secure data broker 254, and the secure data broker 254 uses the authorization information to determine whether to perform queries on behalf of the client device. For example, the secure data broker 254 may pass an access token received from a client device to the cloud-based public safety platform 230, which returns a confirmation that the client device may receive data it request from the sensitive data store 260.

In some embodiments, the access token indicates data that the client device is allowed to receive, e.g., particular databases within the sensitive data store 260, and the secure data broker 254 or cloud-based public safety platform 230 determines access rules for the client device based on the access token. In some embodiments, the access token includes data identifying the responder or client device, and the cloud-based public safety platform 230 looks up current permissions for the responder or client device based on the identifying data, and returns these permissions to the secure data broker 254. For example, the cloud-based public safety platform 230 maintains up-to-date information describing authorized devices and/or authorized users. An administrator at the PSAP 250 may provide updates to the cloud-based public safety platform 230 regarding which users are authorized, and if authorization for a particular user or device should be revoked (e.g., if a police officer is no longer employed by a police force). The cloud-based public safety platform 230 may enforce one or more rules regarding authorization, e.g., determining that a user is authorized during a certain time of day (e.g., a police officer is authorized during his shift, but not outside of his shift), certain days of the week (e.g., days on which the police officer is scheduled to work), or within certain geographic areas (e.g., within a police officer's assigned territory).

The cloud-based public safety platform 230 includes an audit and response repository 232. The audit and response repository 232 stores audit data for queries of the sensitive data store 260 provided by the secure data broker 254. Audit data may include, for example, information identifying the client device and/or responder submitting a query, a time at which a query was submitted, a location of the client device, etc. The audit and response repository 232 also stores queries and query responses ("response data"). The response data is encrypted by a broker key. The audit and response repository 232 may associate queries with responses, so that the secure data broker 254 may submit a query to the audit and response repository 232, and, if the audit and response repository 232 stores the response associated with that query, the audit and response repository 232 retrieves and returns the response associated with the query. In some embodiments, the audit and response repository 232 is implemented as two or more separate repositories, e.g., an audit repository and a response repository.

The cloud-based public safety platform 230 is implemented by one or more highly secure and reliable servers. For example, the cloud-based public safety platform 230 may operate on the Microsoft Azure Government cloud.

In some embodiments, a key-vault system 240 is used to store the broker key used by the secure data broker 254. The key-vault system 240 is a cloud-based key-management service. The key-vault system 240 employs one or more hardware security modules (HSM) to protect the broker key. In some embodiments, users and administrators of the key-vault system 240 do not have direct access to keys stored in the key-vault system 240. Instead, users (e.g., an administrator of the PSAP 250) grant permissions for their applications (e.g., the secure data broker 254) to access and use the keys (e.g., the broker key) when needed. The key-vault system 240 may employ a key-vault permission system for authentication. The key-vault system 240 provides a secure, symmetric encryption key for the secure data broker 254 to use as the broker key. The secure data broker 254 can encrypt and decrypt data (e.g., audit and/or response data) using the broker key. In other embodiments, the secure data broker 254 does not use a key-vault system to store the broker key. For example, the secure data broker may use an HSM located on-site at the PSAP 250 to store the broker key.

The off-site client 210, the mobile device client 220, the cloud-based public safety platform 230, the key-vault system 240, the dispatcher system 252, and the secure data broker 254 are each connected to public network 270. The public network 270 may include one or more of the Internet, a local area network (LAN), a wide area network (WAN), a radio band, a wireless local area network (WiFi), etc.

While several examples described herein are described in the context of public safety and emergency response, in other embodiments, the secure data broker 254 can be used outside of such contexts. For example, the secure data broker 254 and secure data interface 256 may be implemented in outside of the PSAP 250. For example, the secure data broker 254 and secure data interface 256 may be implemented at a police station that does not include a PSAP to access a CJIS database. In another example, the secure data broker 254 and secure data interface 256 are implemented at a hospital, the sensitive data store 260 provides healthcare records, and the environment 200 is configured to provide sensitive health records to authorized user devices located outside a private network of the hospital.

Figure 3:
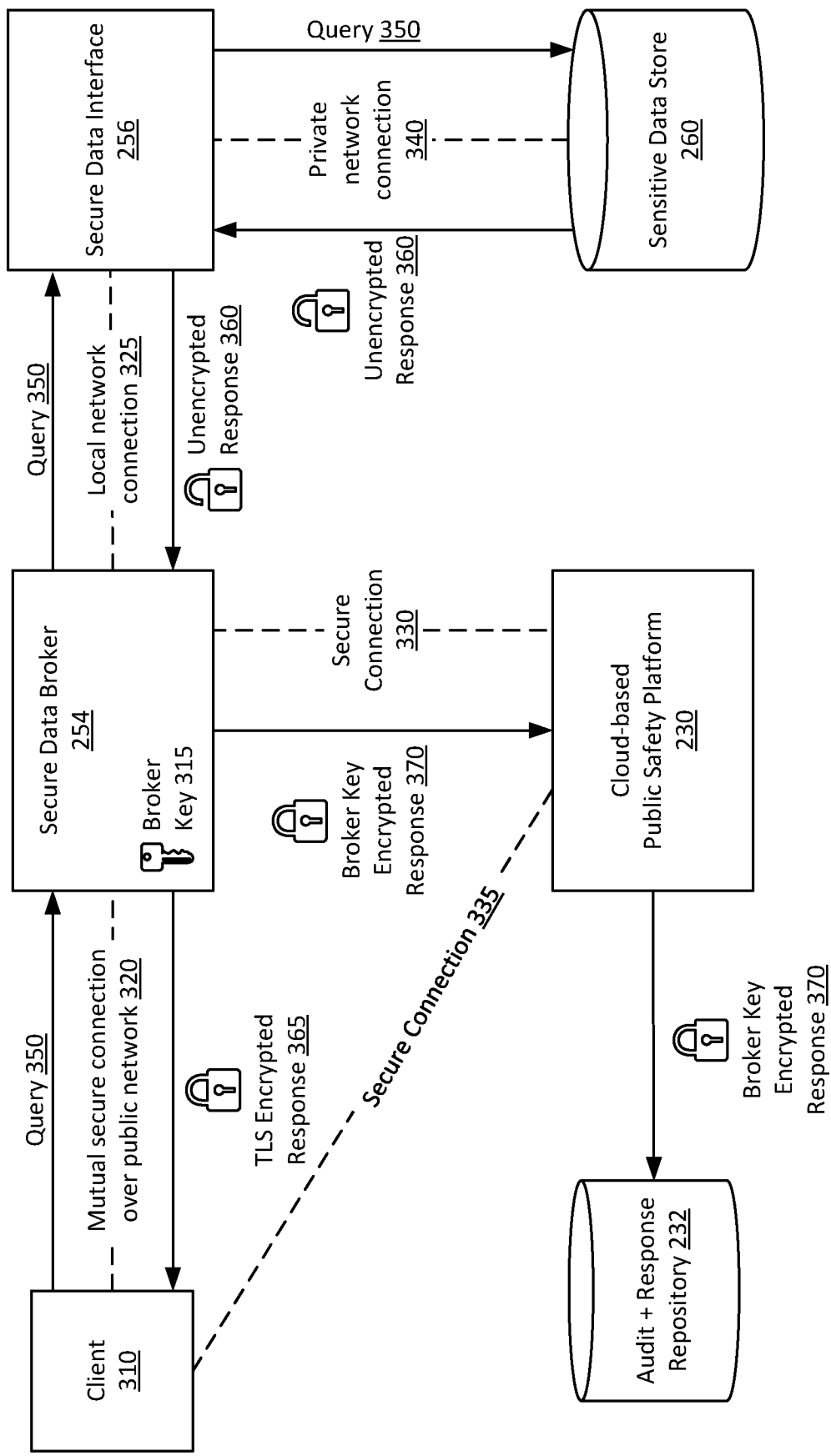
FIG. 3 is a block diagram illustrating data flows and network connections for providing sensitive data to a client device, in accordance with one example embodiment.

FIG. 3 is a block diagram illustrating data flows and network connections for providing sensitive data to a client device, in accordance with one example embodiment. The block diagram includes a client 310, which may be the off-site client 210 or the mobile device client 220. The block diagram also includes the secure data broker 254, the secure data interface 256, the audit and response repository 232, the cloud-based public safety platform 230, and the sensitive data store 260, which are described with respect to FIG. 2.

The client 310 is connected to the secure data broker 254 via a mutual secure connection 320 over a public network. The client 310 and secure data broker 254 communicate via the public network 270. To form the mutual secure connection 320 on the public network 270, the client 310 and secure data broker 254 perform a mutual authentication procedure, such as a transport layer security (TLS) handshake. The mutual authentication procedure creates a secure, private connection between the client 310 and secure data broker 254. For example, according to the mutual authentication procedure, the client 310 and secure data broker 254 may both authenticate each other by receiving certificates from each other and validating these certificates with a certificate authority. This is referred to as certificate-based mutual authentication. The client 310 and secure data broker 254 also establish a symmetric key used to encrypt data transmitted between the client 310 and secure data broker 254. In an alternative embodiment, the secure data broker 254 and client 310 communicate via the cloud-based public safety platform 230, e.g., via the secure connection 330 and the secure connection 335.

The secure data broker 254 has or accesses a broker key 315. The broker key 315 may be stored by a key-vault, such as key-vault system 240, as described in relation to FIG. 2. Alternatively, the broker key 315 may be stored by the secure data broker 254, by a HSM located on-site at the PSAP 250, or by another device or cloud location.

The secure data broker 254 connects to the secure data interface 256 via a local network connection 325. For example, each of the devices within the PSAP 250, including the devices on which the secure data broker 254 and the secure data interface 256 execute, are connected to a LAN or VPN of the PSAP 250. In some embodiments, the secure data broker 254 and the secure data interface 256 are executed by the same device. In still other embodiments, the secure data interface 256 is a module or component of the secure data broker 254.

The secure data interface 256 connects to the sensitive data store 260 via a private network connection 340. This is a connection over the private network 280, described with respect to FIG. 2.

The secure data broker 254 is connected to the cloud-based public safety platform 230 via a secure connection 330. The secure data broker 254 and cloud-based public safety platform 230 form the secure connection 330 and communicate via the public network 270. One or both of the secure data broker 254 and cloud-based public safety platform 270 may perform an authentication procedure over the public network 270 to form the secure connection 330, e.g., a mutual authentication procedure similar to the mutual authentication procedure described with respect to the mutual secure connection 320. In some embodiments, the secure data broker 254 and the cloud-based public safety platform 230 communicate using an API (application programming interface), AMQP (advanced message queuing protocol), or other communication protocol. Messages may be encrypted using a symmetric key or an asymmetric key, depending on the protocol.

The client 310 is connected to the cloud-based public safety platform 230 via a secure connection 335. The client 310 and the secure data broker 254 form the secure connection 335 and communicate via the public network 270. One or both of the client 310 and cloud-based public safety platform 230 may perform an authentication procedure over the public network 270 to form the secure connection 335, e.g., a mutual authentication procedure similar to the mutual authentication procedure described with respect to the mutual secure connection 320, or a one-way authentication procedure.

The cloud-based public safety platform 230 connects to the audit and response repository 232. The audit and response repository 232 is a cloud storage system managed by the cloud-based public safety platform 230. The audit and response repository 232 may be a storage module of the cloud-based public safety platform 230, as shown in FIG. 2, or it may be separate from the cloud-based public safety platform 230, as shown in FIG. 3.

The client 310 submits a query 350 to the secure data broker 254 over the mutual secure connection 320 over the public network. For example, the client 310 receives one or more search terms (e.g., a name, a license plate number, a driver's license number, an address, etc.) into a search form displayed by the client 310, e.g., by the web browser 212 or the emergency application 222. The web browser 212 or emergency application 222 extracts the search terms and transmits the search terms as the query 350 to the secure data broker 254. The client 310 may also submit an access token with the query 350, and the secure data broker 254 uses the access token to establish that the client 310 is authorized to receive a response to the query 350. The secure data broker 254 transmits the query 350 to the secure data interface 256 over the local network connection 325. The secure data interface 256 transmits the query 350 to the sensitive data store 260 over the private network connection 340. The secure data broker 254 and/or secure data interface 256 may reformat the query 350 or transmit additional information with the query 350. For example, the client 310 transmits authorization information that authorizes the client 310 and/or an operator of the client 310 to the secure data broker 254 with the query 350.

The sensitive data store 260 passes an unencrypted response 360 to the query 350 to the secure data interface 256 over the private network connection 340. The secure data interface 256 passes the unencrypted response 360 to the secure data broker 254 over the local network connection 325. The secure data broker 254 encrypts the response according to the mutual secure connection protocol, e.g., TLS, and transmits the encrypted response 365 to the client 310 via the mutual secure connection 320. The client 310 decrypts the response and outputs the response to a user of the client 310.

In addition, the secure data broker 254 encrypts the unencrypted response 360 with the broker key 315 for storage. The secure data broker 254 transmits the broker key encrypted response 370 to the cloud-based public safety platform 230 over the secure connection 330. In this embodiment, the secure data broker 254 twice encrypts the response—once with the broker key 315, and a second time with the an message encryption key used to encrypt communications from the secure data broker 254 to the cloud-based public safety platform 230. The cloud-based public safety platform 230 may decrypt the message encryption, but the response is still encrypted by the broker key 315. The cloud-based public safety platform 230 stores the broker key encrypted response 370 in the audit and response repository 232.

Secure Data Broker

Figure 4:
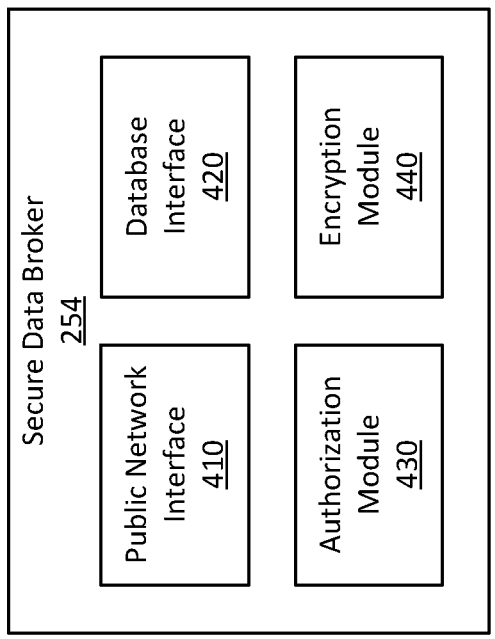
FIG. 4 is a block diagram of a secure data broker, in accordance with one example embodiment.

FIG. 4 is a block diagram of the secure data broker 254, in accordance with one example embodiment. The secure data broker 254 includes a public network interface 410, a database interface 420, an authorization module 430, and an encryption module 440. In alternative configurations, different and/or additional components may be included in the secure data broker 254. Further, functionality attributed to one component of the secure data broker 254 may be accomplished by a different component included in the secure data broker 254 or a different component from those illustrated.

The public network interface 410 connects the secure data broker 254 to the public network 270, e.g., the Internet. The public network interface 410 may be configured to perform the mutual authentication procedure, e.g., a TLS handshake, as described with respect to FIG. 3. The public network interface 410 is also configured to transmit and receive data over the public network 270. For example, the public network interface 410 receives search queries and authorization information from one or more clients (e.g., clients 210, 220, and 310) and transmit responses to the queries. The public network interface 410 transmits requests to the cloud-based public safety platform 230 to authorize the one or more clients based on the received authorization information, and receives authorization confirmations or denials from the cloud-based public safety platform 230. The public network interface 410 transmits audit data and encrypted response data to the cloud-based public safety platform 230 for storage, and retrieves the audit data and encrypted response data from the cloud-based public safety platform 230.

The database interface 420 interfaces with the sensitive data store 260. The database interface 420 may be a local network connection for connecting to the secure data interface 256. In other embodiments, the database interface 420 is the secure data interface 256, e.g., if the secure data interface 256 is a component of the secure data broker 254.

The authorization module 430 is configured to authorize a client to receive data from the sensitive data store based on the authorization information received from the client via the public network interface 410. In some embodiments, the authorization module 430 extracts the authorization information (e.g., an access token) received from the client, generates an authorization request including the authorization information to transmit to the cloud-based public safety platform 230, and receives the authorization confirmation (or denial) from the cloud-based public safety platform 230. In some embodiments, the authorization module 430 analyzes the authorization information itself and determines whether the client is authorized based on the authorization information. For example, the authorization module 430 may receive information describing current, valid access tokens from the cloud-based public safety platform 230, and compare the received access token to this information to determine whether the client is authorized. In some embodiments, the authorization module 430 can revoke authorization for a client, e.g., if a client device is marked as being lost.

In some embodiments, the authorization module 430 generates audit data describing the authorization process (e.g., the identity of the client device and/or user of the client device, whether or not the authorization was successful). The public network interface 410 transmits the audit data to the cloud-based public safety platform 230 for storage by the audit and response repository 232.

The encryption module 440 encrypts and decrypts data using the broker key 315. The encryption module 440 accesses the broker key 315 from the key-vault system 240 or other storage system. The encryption module 440 encrypts query responses using the broker key 315 for storage in the audit and response repository 232. The encryption module 440 may also encrypt queries for storage in the audit and response repository 232. The encryption module 440 receives encrypted query responses from the audit and response repository 232 and decrypts the query responses using the broker key 315. In some embodiments, the encryption module 440 also encrypts audit data for storage in the audit and response repository 232 using the broker key 315, and decrypts the audit data if it is returned to the encryption module 440.

Authorization Process

Figure 5:
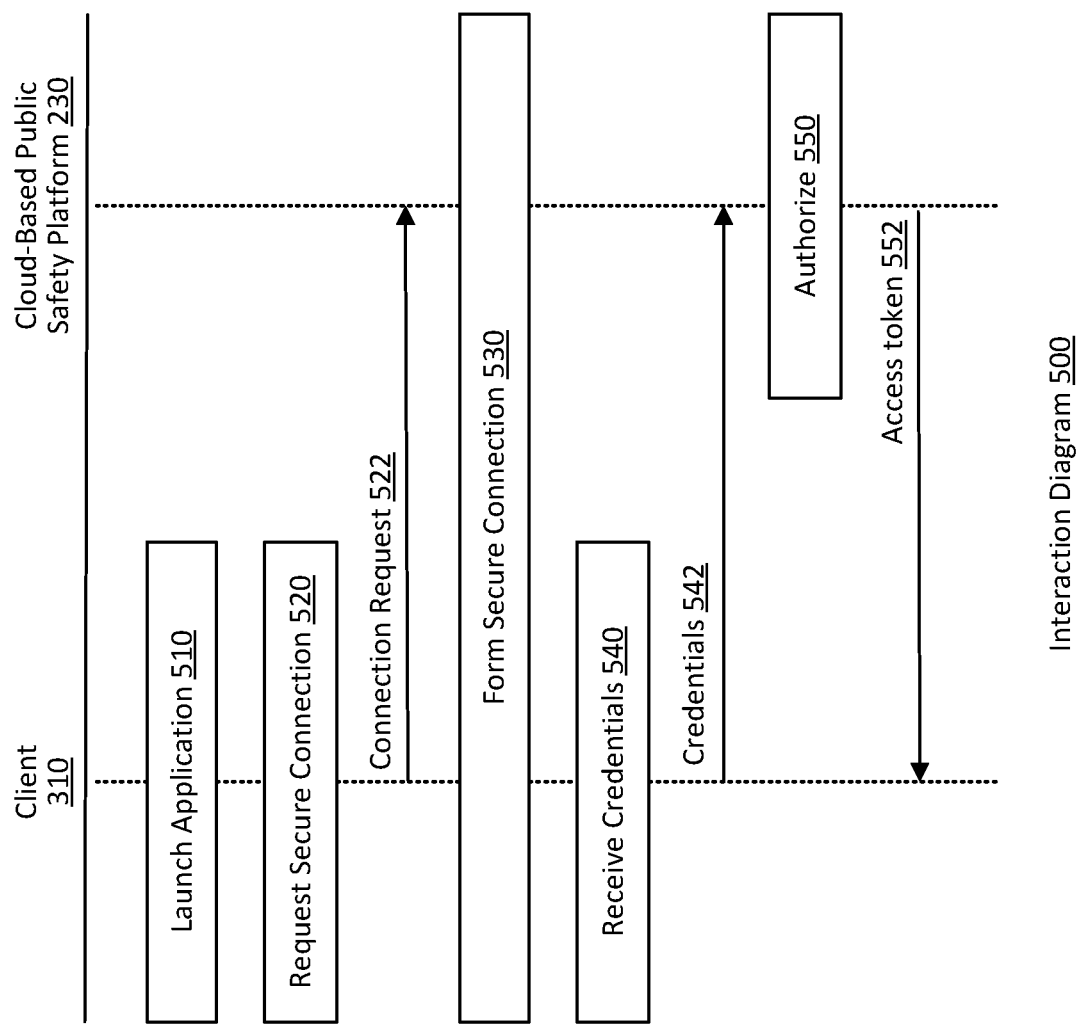
FIG. 5 is an illustration of an interaction diagram showing a process for authorizing a user to access sensitive data, in accordance with one example embodiment.

FIG. 5 is an illustration of an interaction diagram 500 showing a process for authorizing a user to access sensitive data, in accordance with one example embodiment. As a particular example, a police officer is working traffic duty in his police cruiser. The police cruiser is equipped with a client 310 configured to execute an application that allows the police officer to search the sensitive data store 260. The officer launches 510 the application (e.g., a browser-based application in the web browser 212, or the emergency application 222), e.g., by selecting the application in a user interface, or navigating to the application in a browser. The application requests 520 a secure connection with the cloud-based public safety platform 230. The connection request 522 is sent to the cloud-based public safety platform 230, and the client 310 and cloud-based public safety platform 230 form a secure connection 530 as described with respect to the connection 335 in FIG. 3.

After the secure connection 530 is formed, the client 310 receives 540 credentials from the user. For example, the police officer logs into the application executed by the client 310 using security credentials (e.g., a user name and password). The credentials may include additional or alternative information about the client 310 and/or the user. The client 310 transmits the credentials 542 to the cloud-based public safety platform 230, and the cloud-based public safety platform 230 authorizes 550 the user and/or client 310 based on the credentials 542. The cloud-based public safety platform 230 transmits an access token 552 to the client 310. The access token 552 authorizes the user and/or client 310 to access sensitive data stored in the sensitive data store 260 via the secure data broker 254. If the cloud-based public safety platform 230 determines that the user and/or client 310 are not authorized to access the sensitive data, the cloud-based public safety platform 230 informs the secure data broker 254 that the client 310 has been denied access. The secure data broker 254 may generate audit records regarding the authorizations and denials of clients, and transmit the audit records to the cloud-based public safety platform 230 for storage in the audit and response repository 232. The secure data broker 254 may encrypt the audit records with the broker key 315 prior to storage.

Query Processes

FIG. 6 is an illustration of an interaction diagram 600 showing a process for securely providing sensitive to a client using a secure data broker, in accordance with one example embodiment. The process shown in FIG. 6 may be performed after the client authorization process shown in FIG. 5.

The client 310 and the secure data broker 254 form a secure connection 610. The secure connection 610 may be formed as described in relation to the mutual secure connection 320 of FIG. 3. For example, the client 310 performs a TLS handshake or other certificate-based mutual authentication procedure with the secure data broker 254. The client 310 receives 620 a query from a user. In one example, the police officer observes a vehicle travelling above the speed limit and makes a traffic stop. Before approaching the vehicle, the police officer can request law enforcement data about the stopped vehicle using the vehicle's license plate number. To do so, the police officer (having already received authorization, as described with respect to FIG. 5), enters the license plate number into a search query form provided by the client 310. In another example, the query 620 is generated automatically by the client 310 or a cloud-based service, e.g., by performing character recognition on an image of the stopped vehicle captured by a camera mounted on or inside of the police officer's car and connected to the client 310, or by a camera included in the client 310.

The client 310 transmits the query 622 along with the access token 552 to the secure data broker 254. The secure data broker 254 forms a secure connection 630 with the cloud-based public safety platform 230. The secure connection 630 may be formed as described in relation to the secure connection 330 of FIG. 3. In some embodiments, the secure connection 630 is formed prior to the secure data broker 254 receiving the query 622 and the access token 552.

The secure data broker 254 transmits the access token 632 to the cloud-based public safety platform 230 over the secure connection 630. The cloud-based public safety platform 230, which had provided the access token 632 to the client 310, confirms 640 that the client 310 is authorized to perform queries of the sensitive data store 260 and transmits an authorization confirmation 642 to the secure data broker 254. As described with respect to FIG. 2, the cloud-based public safety platform 230 may maintain current information describing authorized devices and users. Each time a new query is received at the secure data broker 254, the secure data broker 254 may request that the cloud-based public safety platform 230 confirm 640 that the querying user and/or device are authorized based on authorization records stored at the cloud-based public safety platform 230. This ensures that sensitive data is only provided to authorized users. In some embodiments, an authorization may persist for a threshold amount of time, e.g., 10 minutes, and any queries received within the threshold time period after an authorization are performed. The secure data broker 254 may generate audit records regarding the authorizations and denials of query requests, and transmit the audit records to the cloud-based public safety platform 230 for storage in the audit and response repository 232.

After receiving the authorization confirmation 642, the secure data broker 254 submits 650 the query 622 to the secure data interface 256. The secure data interface 256 accesses the sensitive data store 260 and retrieves 660 a query response. For the vehicle stop example, the secure data broker 254 passes the license plate number to the secure data interface 256, and the secure data interface 256 transmits the license plate number to a CJIS database. The CJIS database returns data associated with the license plate number, such as data identifying an owner of the vehicle, outstanding tickets associated with the vehicle, outstanding warrants associated with the vehicle, etc. The secure data interface 256 forwards the query response 662 to the client 310. The client 310 outputs 680 the query response, e.g., by displaying the response 662 on an on-screen interface, or reading out the response 662 using a speaker.

Figure 7:
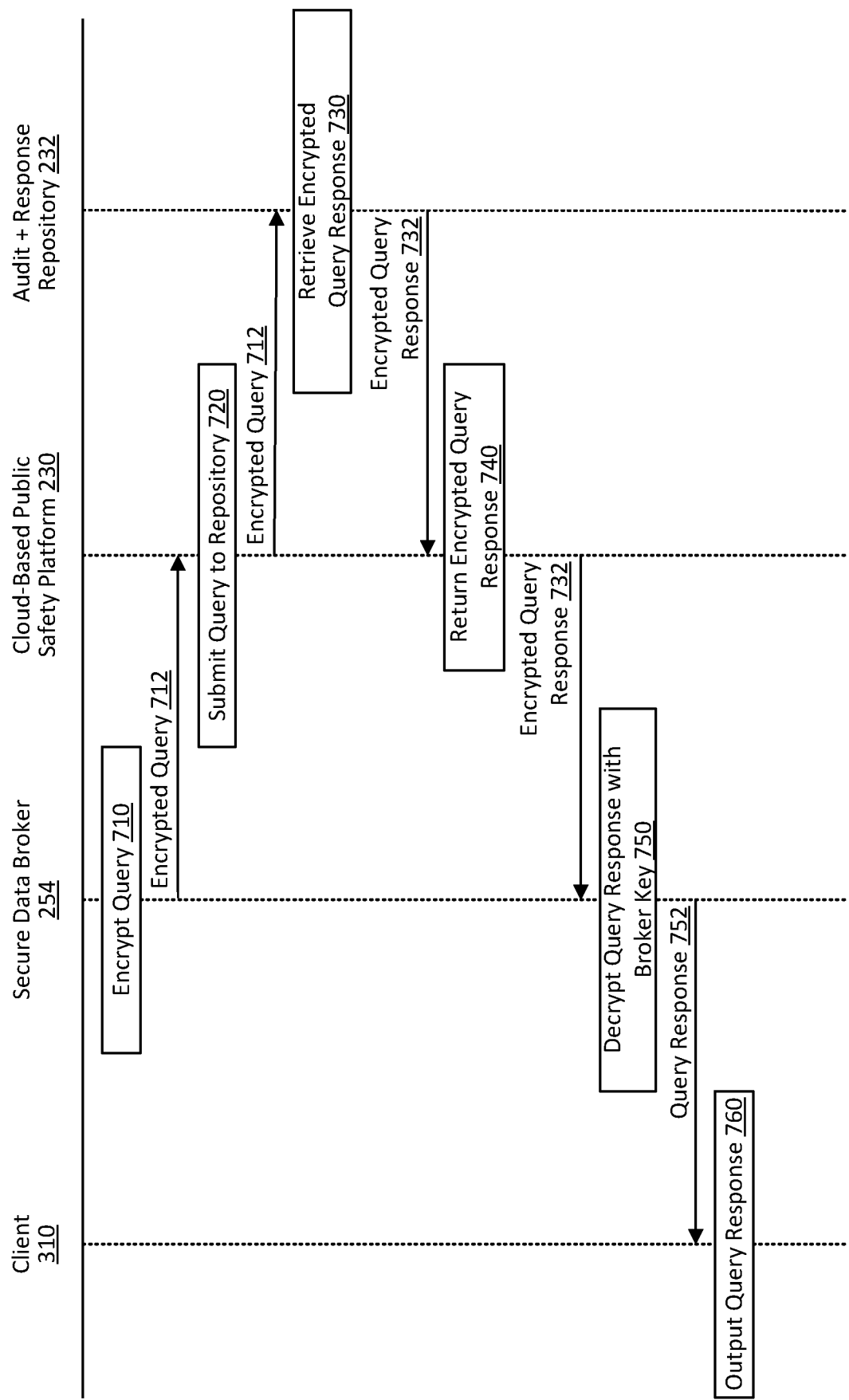
FIG. 7 is an illustration of an interaction diagram showing an alternative portion of a process for securely providing sensitive to a client using a secure data broker, in accordance with one example embodiment.

The secure data broker 254 generates a repository record 690 by encrypting the query 622 and query response 662 using the broker key 315 and sends the encrypted repository record 692 to the cloud-based public safety platform 230 for storage in the audit and response repository 232. The repository record 692 may be used to look up the query response 662 for later use, as shown in FIG. 7. The secure data broker 254 may additionally or alternatively generate an audit record describing the query and delivery of query response to the client 310, and store the audit record in the audit and response repository 232.

FIG. 7 is an illustration of an interaction diagram 700 showing an alternative portion of a process for securely providing sensitive to a client using a secure data broker, in accordance with one example embodiment. In this process, the secure data broker 254 may have already formed secure connections with the client 310 and cloud-based public safety platform 230, received a query from the client 310, and confirmed authorization of the client 310, according to steps 610-640 shown in FIG. 6. Rather than submitting the query to the secure data interface 256, the secure data broker 254 sends the query to the cloud-based public safety platform 230 to search for the query response in the audit and response repository 232.

In particular, the secure data broker 254 encrypts 710 the query using the broker key 315. The secure data broker 254 transmits the encrypted query 712 to the cloud-based public safety platform 230, which submits 720 the encrypted query 712 to the audit and response repository 232. The audit and response repository 232 stores encrypted queries associated with encrypted responses, as described above. The audit and response repository 232 searches its records for the encrypted query 712 and, if a response to the encrypted query is stored in its records, retrieves 730 the query response, which is also encrypted with the broker key 315. The audit and response repository 232 transmits the encrypted query response 732 to the cloud-based public safety platform 230, which returns 740 the encrypted query response 732 to the secure data broker 254. The secure data broker 254 decrypts 750 the encrypted query response 732 with the broker key 315, and returns the query response 752 to the client 310. The client 310 outputs 760 the query response, e.g., by displaying the response 752 on an on-screen interface, or reading out the response 752 using a speaker.

The audit and response repository 232 may store queries and query responses for a threshold period of time, e.g., one week or one month. After this period of time, the audit and response repository 232 may delete the repository record, or mark the repository record as stale. If the query response is not found by the audit and response repository 232 or is stale, the secure data broker 254 may then submit the query to the secure data interface 256 to search the sensitive data store 260, as shown in FIG. 6.

Figure 8:
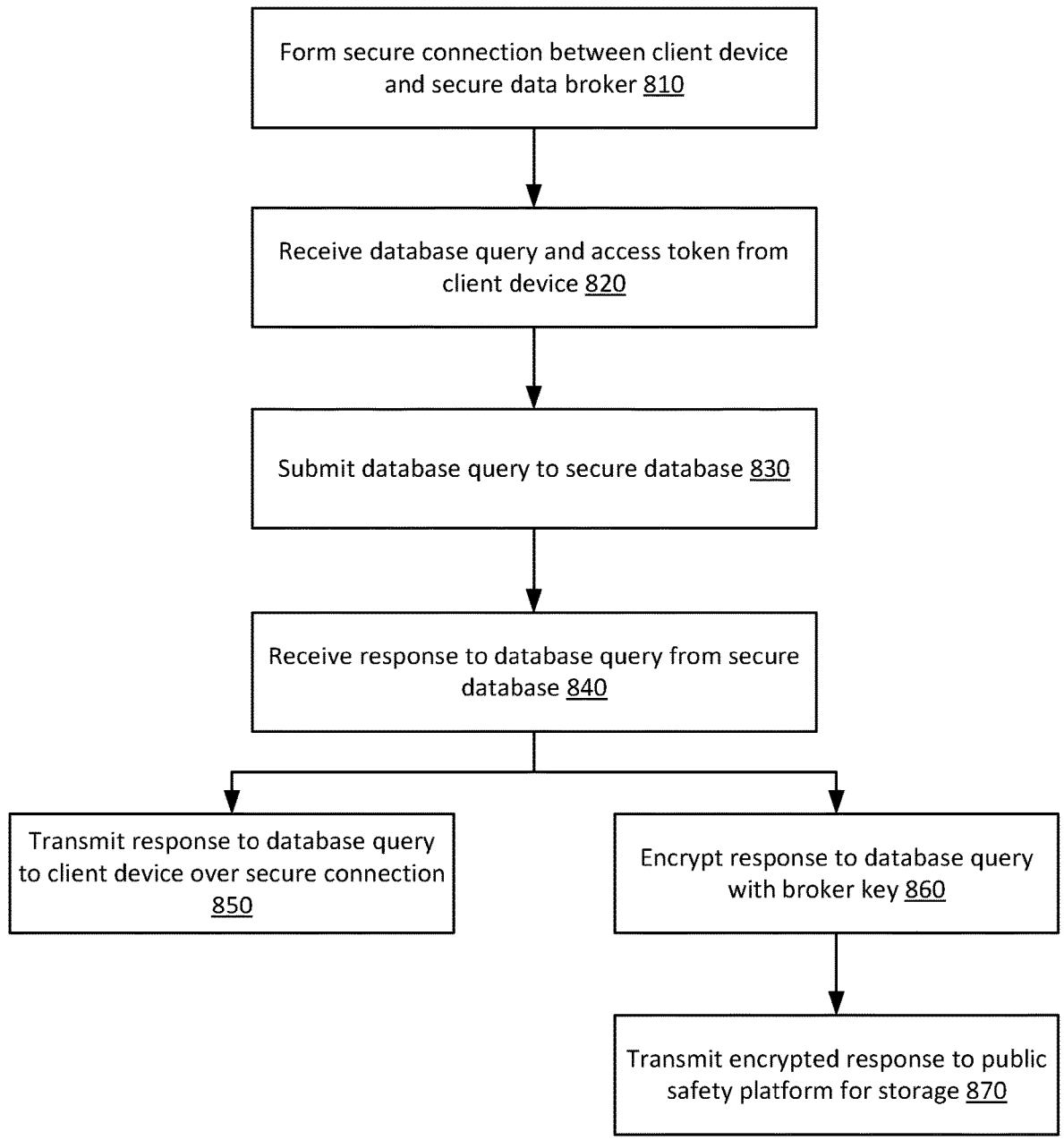
FIG. 8 is a flowchart showing a process for securely providing data to a client system using a secure data broker, in accordance with one example embodiment.

FIG. 8 is a flowchart showing a process for securely providing data to a client system using a secure data broker, in accordance with one example embodiment. The client device and secure data broker form 810 a secure connection between the client device (e.g., client 210, 220, or 310) and the secure data broker (e.g., secure data broker 254). The secure data broker retrieves 820 a database query and an access token from the client device. The secure data broker submits 830 the database query to a secure database, e.g., by submitting the database query to the secure data interface 256, which searches the sensitive data store 260. The secure data broker receives 840 a response to the database query from the secure database, e.g., via the secure data interface 256. The secure data broker transmits 850 the response to the database query to the client device over a secure connection, e.g., a certificate-based mutual secure connection. The secure data broker also encrypts 860 the response to the database query with a broker key, e.g., broker key 315. The secure data broker transmits 870 the encrypted response to a public safety platform, e.g., the cloud-based public safety platform 230, for storage, e.g., in the audit and response repository 232.

Example Computer System

Figure 9:
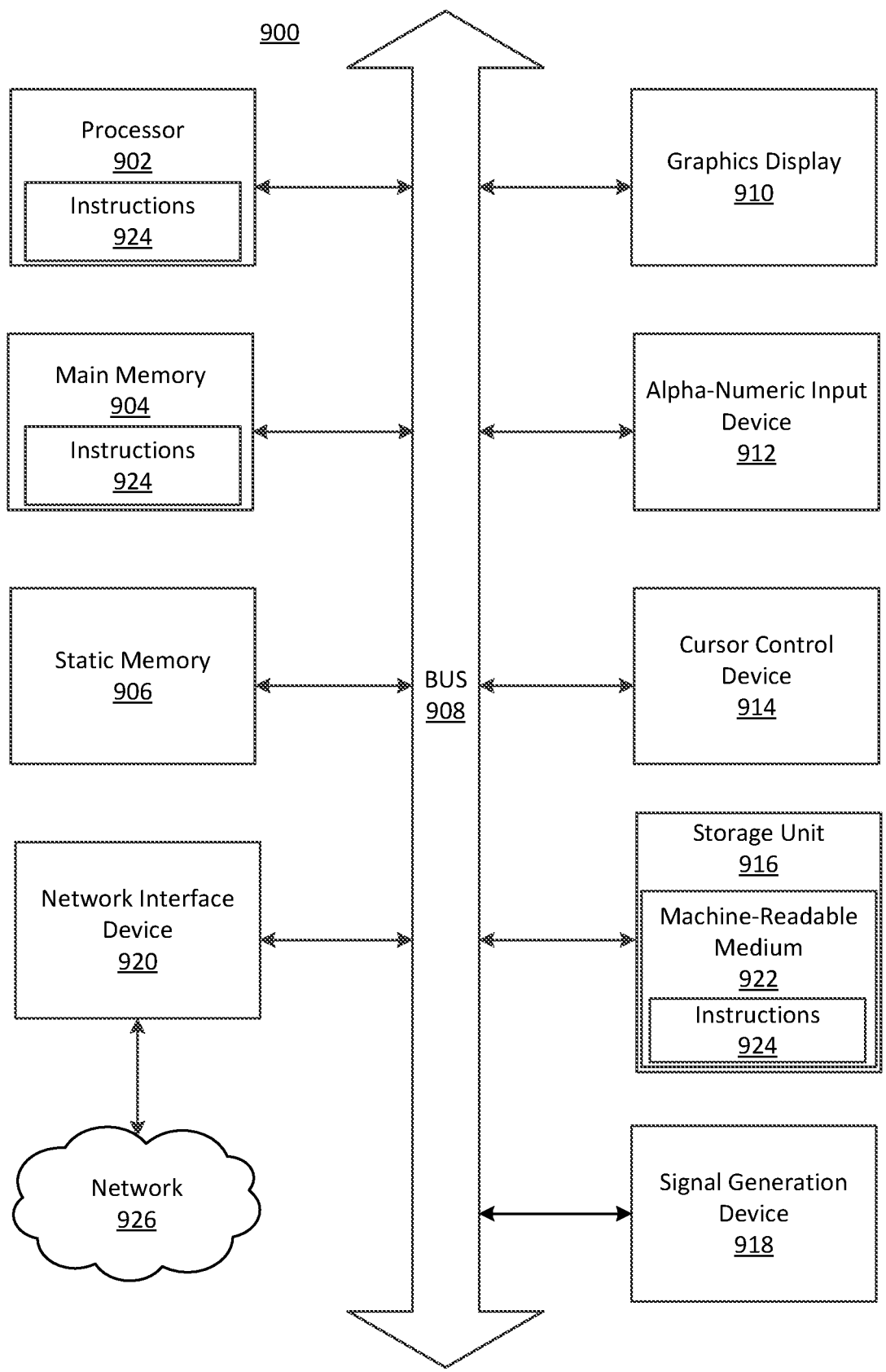
FIG. 9 is a block diagram illustrating components of an example machine for reading and executing instructions from a machine-readable medium, in accordance with one example embodiment.

FIG. 9 is a block diagram illustrating components of an example machine for reading and executing instructions from a machine-readable medium, according to one example embodiment. Specifically, FIG. 1 shows a diagrammatic representation of one or more of the off-site client 210, mobile device client 220, cloud-based public safety platform 230, key-vault system 240, dispatcher system 252, secure data broker 254, or secure data interface 256 in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 200, or as a peer machine in a peer-to-peer (or distributed) system environment 200.

The machine may be a server computer, a client computer, a personal computer (PC), a tablet PC, a set-top box (STB), a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904, and the storage unit 916 communicate via a bus 908.

In addition, the computer system 900 can include a static memory 906, a graphics display 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. For example, the instructions 924 may include the functionalities of modules of the environment 200 described in FIG. 2. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 (e.g., public network 270) via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a desktop agent. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A method for searching a secure database on behalf of a client device comprising:
    forming, by a secure data broker, a secure connection over a network with the client device;
    receiving, at the secure data broker from the client device, a database query and an access token, wherein the access token authorizes the client device to access the secure database, and the access token is received at the client device from a public safety platform in response to a user authorization procedure;
    submitting the database query to the secure database;
    receiving, at the secure data broker, a response to the database query from the secure database;
    transmitting the response to the database query to the client device over the secure connection, wherein the client device is configured to provide the response to the database query to a user of the client device;
    encrypting the response to the database query using a broker key; and
    transmitting the encrypted response to the database query to the public safety platform, wherein the public safety platform stores the encrypted response.

2. The method of claim 1, wherein forming the secure connection with the client device comprises performing a mutual authentication procedure between the client device and the secure data broker.

3. The method of claim 1, further comprising:
    transmitting, from the secure data broker to the public safety platform, the access token received from the client device; and
    receiving from the public safety platform a confirmation that the user of the client device is authorized to access the secure database via the secure data broker.

4. The method of claim 1, wherein submitting the database query to the secure database comprises transmitting the database query via a local connection to a data interface, wherein the data interface is connected to the secure database over a private network connection and configured to submit queries to and receive responses from the secure database.

5. The method of claim 1, further comprising submitting audit data to the public safety platform, the audit data comprising at least one of an authorization result for the client device and the database query encrypted by the broker key.

6. The method of claim 1, wherein the public safety platform does not have access to the broker key to decrypt the response to the database query.

7. The method of claim 1, further comprising:
    receiving a second database query;
    transmitting the second database query to the public safety platform;
    receiving the encrypted response to the database query from the public safety platform; and
    decrypting the encrypted response using the broker key.

8. The method of claim 7, further comprising encrypting the second database query with the broker key, and wherein transmitting the second database query to the public safety platform comprises transmitting the second database query encrypted with the broker key to the public safety platform.

9. The method of claim 1, wherein the secure data broker runs on a device housed in a public safety answering point (PSAP), the client device connects to the secure data broker across a public network, and the secure data broker connects to the public safety platform across the public network.

10. The method of claim 1, wherein the public safety platform is a cloud-based computer-aided dispatch (CAD) platform, the user of the client device is an emergency responder, and the secure database is a criminal justice information services (CJIS) database.

11. A non-transitory computer-readable medium storing instructions for searching a secure database on behalf of a client device, the instructions, when executed by a processor, cause the processor to:
    form, by a secure data broker, a secure connection over a network with the client device;
    receive, at the secure data broker from the client device, a database query and an access token, wherein the access token authorizes the client device to access the secure database, and the access token is received at the client device from a public safety platform in response to a user authorization procedure;
    submit the database query to the secure database;
    receive, at the secure data broker, a response to the database query from the secure database;

transmit the response to the database query to the client device over the secure connection, wherein the client device is configured to provide the response to the database query to a user of the client device;

encrypt the response to the database query using a broker key; and transmit the encrypted response to the database query to the public safety platform, wherein the public safety platform stores the encrypted response.

12. The computer-readable medium of claim 11, wherein forming the secure connection with the client device comprises performing a mutual authentication procedure between the client device and the secure data broker.

13. The computer-readable medium of claim 11, wherein the instructions further cause the processor to:

transmit, from the secure data broker to the public safety platform, the access token received from the client device; and receive from the public safety platform a confirmation that the user of the client device is authorized to access the secure database via the secure data broker.

14. The computer-readable medium of claim 11, wherein submitting the database query to the secure database comprises transmitting the database query via a local connection to a data interface, wherein the data interface is connected to the secure database over a private network connection and configured to submit queries to and receive responses from the secure database.

15. The computer-readable medium of claim 11, wherein the instructions further cause the processor to submit audit data to the public safety platform, the audit data comprising at least one of an authorization result for the client device and the database query encrypted by the broker key.

16. The computer-readable medium of claim 11, wherein the public safety platform does not have access to the broker key to decrypt the response to the database query.

17. The computer-readable medium of claim 11, wherein the instructions further cause the processor to:

receive a second database query;

transmit the second database query to the public safety platform;

receive the encrypted response to the database query from the public safety platform; and decrypt the encrypted response using the broker key.

18. The computer-readable medium of claim 17, wherein the instructions further cause the processor to encrypt the second database query with the broker key, and wherein transmitting the second database query to the public safety platform comprises transmitting the second database query encrypted with the broker key to the public safety platform.

19. The computer-readable medium of claim 11, wherein the secure data broker runs on a device housed in a public safety answering point (PSAP), the client device connects to the secure data broker across a public network, and the secure data broker connects to the public safety platform across the public network.

20. The computer-readable medium of claim 11, wherein the public safety platform is a cloud-based computer-aided dispatch (CAD) platform, the user of the client device is an emergency responder, and the secure database is a criminal justice information services (CJIS) database.

* * * * *